(12) United States Patent (10) Patent No.: US 6,989,814 B1
Mattson (45) Date of Patent: *Jan. 24, 2006

(54) MOUSEPAD WITH A HIDDEN WRITING SURFACE, AN APPARATUS AND A METHOD OF USING THE SAME

(75) Inventor: Brian M. Mattson, Chicago, IL (US)

(73) Assignee: Patents & TMS, P.C., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/572,214

(22) Filed: May 17, 2000

(51) Int. Cl.
*G09G 5/00* (2006.01)

(52) U.S. Cl. .................. 345/156; 312/283; D14/402; 248/346.01

(58) Field of Classification Search ............... 345/156, 345/157, 163; D14/114; 312/283, 231; 248/346.01, 918, 118
See application file for complete search history.

(56) References Cited

U.S. PATENT DOCUMENTS

| 5,405,168 | A |   | 4/1995 | Holt |
|---|---|---|---|---|
| D370,472 | S | * | 6/1996 | Scianna ................... D14/114 |
| 5,542,637 | A |   | 8/1996 | Schriner |
| D376,177 | S | * | 12/1996 | Springer .................... D14/114 |
| D388,416 | S | * | 12/1997 | Jones ........................ D14/114 |
| 5,692,815 | A | * | 12/1997 | Murphy ...................... 312/283 |
| 5,791,620 | A |   | 8/1998 | Carcich, Jr. |
| D405,771 | S | * | 2/1999 | Nachinson et al. ........ D14/114 |
| D411,192 | S | * | 6/1999 | Wu ........................ D14/117.3 |
| 5,971,340 | A |   | 10/1999 | Murphy |
| D423,482 | S | * | 4/2000 | Eddins ...................... D14/114 |
| 6,070,845 | A | * | 6/2000 | Herskovitz ............. 248/346.01 |

\* cited by examiner

*Primary Examiner*—Kent Chang
(74) *Attorney, Agent, or Firm*—Patents & TMS, P.C.

(57) ABSTRACT

A password security apparatus, a mousepad and a method of using the same are provided. The apparatus, the mousepad and the method include a writing surface contained within the mousepad or apparatus. The writing surface may be disposed between multiple layers of the mousepad or may be disposed on the surface of a removable section that may be removed from the mousepad. Contained on the writing surface may be a grid having spaces for the addition of information. The information may be related to websites that a computer user may visit on a computer network such as, for example, the Internet. Further, the information such as, for example, user identification information and/or password information that may be related to the websites may be contained thereon.

14 Claims, 1 Drawing Sheet

MOUSEPAD WITH A HIDDEN WRITING SURFACE, AN APPARATUS AND A METHOD OF USING THE SAME

BACKGROUND OF THE INVENTION

The present invention generally relates to a mousepad. More specifically, the present invention relates to a mousepad having a hidden writing surface, an apparatus and a method of using the same. Further, the present invention relates to a mousepad having a hidden writing surface contained within layers of the mousepad and/or on an internal section separable from a remainder of the mousepad.

It is, of course, generally known to provide mousepads to be used as a surface on which a mouse may be transferred thereon used generally in connection with a computer system. The mousepad may be composed of a layer of rubberized material having a gripping surface on one side for gripping a desk, and a cloth material contained on an opposite side for a computer mouse to be utilized thereon. Generally, the mousepad is comprised of two layers, the rubberized material and the cloth material, both of which are attached to one another via an adhesive. In use, the mousepad generally may be placed atop a desk or a table relatively close to a computer system. A computer mouse, extending from the computer system, may be utilized on the mousepad. Specifically, a smooth surface may allow a rollerball contained with the mouse to roll thereby controlling a cursor or an arrow, for example, on a computer screen.

Further, it is also generally known to utilize a global computer network such as, for example, the internet on a computer system via a computer mouse utilized on a mousepad. The internet includes many websites that may require personal information to be entered thereinto. Further, access to many websites is restricted to individuals who have permission to use the website from a website administrator. Access to these restricted websites may generally be achieved by entering a user name and/or an identification and/or a password.

However, often different user identifications or names are used as well as different passwords for each website. Further, for security purposes, the password for any and/or all websites may be changed on a regular basis such as, for example, monthly. Consequently, it may be difficult for an individual to keep track of the multitude of user identifications and passwords that an internet user must use. Further, the variety of passwords that may be used by a single individual for access to a specific website may be easily confused or forgotten. Further, passwords should be contained in a secure or otherwise secret location to keep the passwords private and inaccessible to other individuals.

A need, therefore, exists for an improved mousepad, a password security apparatus and a method of using the same that overcome the deficiencies noted herein.

SUMMARY OF THE INVENTION

The present invention provides a mousepad, a password security apparatus and a method of using the same. More specifically, the present invention provides a mousepad, a password security apparatus and a method of using the same that allow an individual to contain a plurality of user identification names and/or passwords in a secure and/or discrete location.

To this end, in an embodiment of the present invention, a mousepad is provided. The mousepad has a first layer having a top side and a bottom side. A second layer is removable from the top side of the first layer. A writing surface is provided on the top side of the first layer.

In an embodiment, a fastener is disposed on at least one of the layers for removably attaching the first layer to the second layer.

In an embodiment, the fastener is an adhesive.

In an embodiment, the fastener is on the first layer and the second layer.

In an embodiment, the second layer has a smooth surface capable of transferring a computer mouse thereon.

In an embodiment, the writing surface includes a grid.

In another embodiment of the present invention, an apparatus for storing information is provided. The apparatus has a mousepad having a thickness and further having a top surface and a bottom surface. A removable section is contained in the mousepad and removable from the mousepad wherein the removable section has a thickness less than the thickness of the mousepad. A writing surface is disposed on the removable section.

In an embodiment, the removable section is contained within the mousepad wherein the removable section is substantially the same size and shape as an area from which the removable section is removed from the mousepad.

In an embodiment, the writing surface has a grid.

In another embodiment of the present invention, a method is provided for using a mousepad and for storing information. The method comprises the steps of: providing a mousepad having a writing surface contained within the mousepad; exposing the writing surface; writing information on the writing surface; and concealing the writing surface within the mousepad.

In an embodiment, a first layer is provided having a top surface and a bottom surface in the mousepad. A second layer is removably attached to the first layer. The writing surface is disposed on the top surface of the first layer.

In an embodiment, a fastener is provided that is disposed on one of the first layers of the second layer removably attaching the first layer to the second layer. The first layer is removed to expose the writing surface.

In an embodiment, the fastener is an adhesive.

In an embodiment, a bottom surface is provided to the mousepad. The mouse pad contains an area in the bottom surface of the mousepad and provides a removable section within the area. The removable section has a thickness less than a thickness of the mousepad, and the writing surface is disposed on the removable section.

In an embodiment, the removable section has a top surface and further wherein the writing surface is disposed on the top surface of the removable section.

In an embodiment, the area has an inner surface and further wherein the writing surface adjoins the inner surface when the removable section is contained within the area.

In an embodiment, a grid is provided on the writing surface, and information is written in the grid.

It is, therefore, an advantage of the present invention to provide a password security apparatus, a mousepad and a method of using the same that provide a hidden location for information.

Another advantage of the present invention is to provide a password security apparatus, a mousepad and a method of using the same that provide a writing surface within a mousepad for concealing computer password information.

A further advantage of the present invention is to provide a password security apparatus, mousepad and a method of using the same that are integrated within a computer mousepad.

A still further advantage of the present invention is to provide a password security apparatus, a mousepad and a method of using the same that are located relatively close to a computer system of the user.

Yet another advantage of the present invention is to provide a password security apparatus, a mousepad and a method of using the same that allow access to the concealed information when needed by a user.

Moreover, an advantage of the present invention is to provide a password security apparatus, a mousepad and a method of using the same that provide a grid on a writing surface to contain website user identification and password information thereon.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to a password security apparatus, a mousepad and a method of using the same. More specifically, the present invention provides a password security apparatus, a mousepad and a method of using the same that allow a user of a computer to store and maintain private information such as, for example, user identification names and/or passwords for a computer or an internet website.

Figure 1:
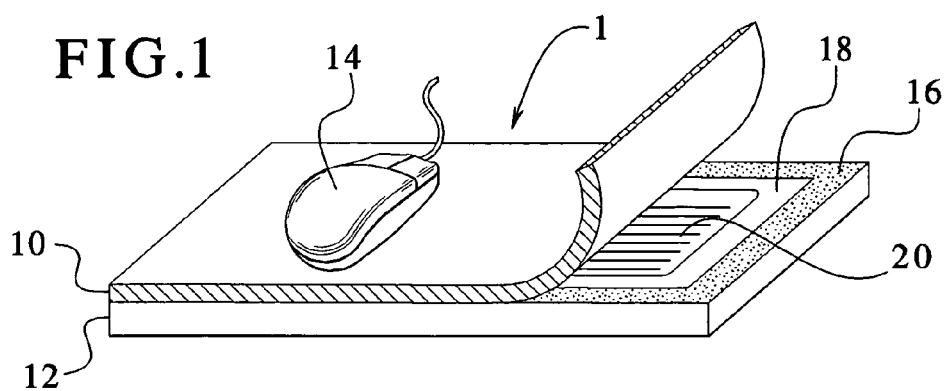
FIG. 1 illustrates a perspective view of a mousepad in an embodiment of the present invention.

Referring now to the drawings, wherein like numerals refer to like parts, FIG. 1 generally illustrates a mousepad 1 having a top layer 10 and a bottom layer 12. The top layer 10 and the bottom layer 12, respectively, may be composed of a rubberized material, a felt or cloth-type material or any other type of material generally that may be apparent to those skilled in the art. Preferably, the top layer 10 may be composed of a cloth-type material to aid in rolling a mouse 14 thereacross that may be connected to a computer system for control of a cursor or an arrow on a computer screen (not shown). The top layer 10 may be removably attached to the bottom layer 12 via a fastener 16. The fastener 16 may be a removable adhesive, a hook and loop type fastener, a magnetic fastener or any other type of fastener that may be apparent to those skilled in the art for removably attaching the top layer 10 to the bottom layer 12. Further, the fastener 16 may be contained around a periphery of the top layer 10 and the bottom layer 12.

Disposed on a top surface 18 of the bottom layer 12 may be a writing surface 20. The writing surface 20 may be composed of cardboard, paper, plastic or any other material that may be apparent to those skilled in the art that may allow information to be written thereupon. For example, the writing surface 20 may be composed of a rigid, plastic writing surface that may be written upon via a marker such as, for example, a dry-erase marker. In addition, information that may be printed upon the writing surface 20 may be removable from the writing surface 20.

Further, the writing surface 20 may be a pad of paper having a plurality of layers that may be contained within the bottom layer 12. As a user enters information on the writing surface 20, the user may remove the top layer from the pad of papers thereby exposing a clean sheet of paper thereunder.

In use, the mousepad 1 may be located near a computer system and may have a mouse 14 utilized thereon. As the user uses the computer system and must retrieve a user ID and/or password information, the user may peel back the top layer 10 from the bottom layer 12 thereby exposing the writing surface 20 on the top surface 18 of the bottom layer 12. The user may then enter information or retrieve information contained on the writing surface 20 to aid the user in using the computer system, for example, providing access to a website. After use, the user may then re-attach the top layer 10 to the bottom layer 12 via the fastener 16. When the top layer 10 is fully attached to the bottom layer 12 via the fastener 16, the writing surface 20 may be completely hidden from view.

Figure 2:
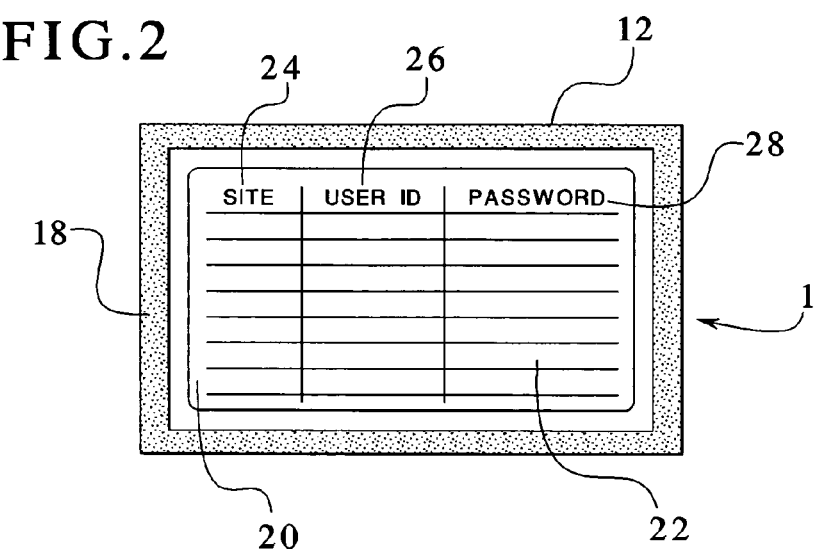
FIG. 2 illustrates a writing surface having a grid thereon in an embodiment of the present invention.

FIG. 2 generally illustrates the top surface 18 of the bottom layer 12 of the mousepad 1. Contained on the top surface 18 may be the writing surface 20. Contained on the writing surface 20 may be a grid 22 having a plurality of rows and columns. The grid 22 may contain areas to enter information thereupon. The information may be related to a website location 24, a user identification 26 and/or a password 28. The grid 22 may aid a user in remembering his or her identification names and/or passwords as they relate to particular sites on a computer network such as, for example, the internet. It should be understood that any information may be written on the grid 22 and should not be limited as herein described. Further, the grid 22 may be presented in any way that may aid a user in storing and keeping information as may be apparent to those skilled in the art. The writing surface 20 may also alternatively be blank and not contain any information except that entered by the user.

Figure 3:
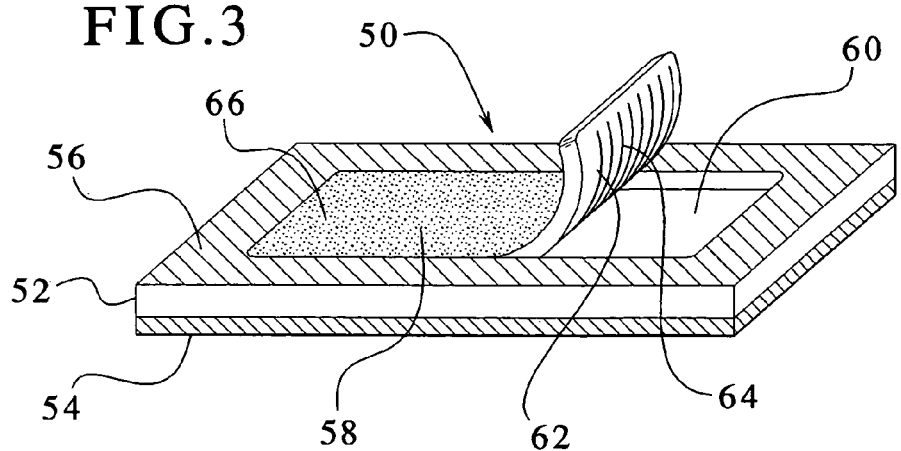
FIG. 3 illustrates a bottom-side view of a mousepad in another embodiment of the present invention.

FIG. 3 illustrates a bottom-side view of another embodiment of a mousepad 50. The mousepad 50 may have a first layer 52 and a second layer 54. The first layer 52 may be composed of the rubberized material or any other material that may be apparent to those skilled in the art that may be used for mousepads. The second layer 54 may be composed of a cloth-type material to aid a computer mouse in rolling thereupon. Further, the first layer 52 may have a textured surface 56 for gripping a desk or a table.

The first layer 52 may have a removable section 58 that may be cut into the first layer 52. The removable section 58 may be contained within a space 60 within the first layer 52. The removable section 58 may peel from the space 60 or may otherwise be removed from the space 60 when the mousepad 50 is, for example, picked up and moved. The space 60 may be cut into less than an entire thickness of the first layer 52 so that the removable section 58 is contained primarily in the first layer 52. When the mousepad 50 is arranged with the second layer 54 on top and the first layer 52 contacting a desk or a table, the removable section 58 and the space 60 may be hidden from view.

Contained on the removable section 58 may be a writing surface 62 having an area for writing information thereupon. The writing surface 62 may have a grid 64 that may be similar to or identical to the grid 22 as shown in FIG. 2.

For example, the writing surface 62 may consist of a rigid, plastic material that may be written thereupon with, for example, a dry erase marker. Alternatively, the writing surface 62 may be any material capable of being written thereon using any type of marking instrument, such as, for example, a pen, a pencil, a marker, or the like. Further, the removable section 58 may be a pad of paper that may fit within the space 60. The pad of paper may be written upon using a writing instrument. When a top page of the pad of paper is no longer needed, it may be removed thereby exposing a clean page for information to be written thereupon.

In use, the mousepad 50 may be oriented with the second layer 54 disposed atop the first layer 52 or inverted from the orientation shown in FIG. 3 with the textured surface 56 adjoining a desktop, for example. When a user references the information contained upon the writing surface 62 or wishes to add information to the writing surface 62, the first layer 52 of the mousepad 50 is lifted thereby exposing the removable section 58. The user may then expose the writing surface 62 of the removable section 58. The user may then reference, for example, the grid 64 for information contained thereon or otherwise add information thereto. When the user is finished using the writing surface 62, the first layer 52 is then placed securely over the removable section 58 within the space 60. The side including the textured surface 56 of the removable section 58 may also include an adhesive 66 or other known fastener to secure the removable section 58 to, for example, a desktop. As a result, the first layer 52 of the mousepad 50 may be more easily separated from the removable section 58 when exposure of the writing surface is desired. In addition, the removable section 59 may remain secured to, for example, a desktop.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A mousepad comprising:
a first layer having a top side and a bottom side;
an opaque second layer removable from the top side of the first layer; and
a surface on which information is written on the top side of the first layer wherein the surface on which information is written is concealed by the opaque second layer.

2. The mousepad of claim 1 further comprising:
a fastener disposed on at least one of the layers for removably attaching the first layer to the second layer.

3. The mousepad of claim 2 wherein the fastener is an adhesive.

4. The mousepad of claim 2 wherein the fastener is on the first layer and the second layer.

5. The mousepad of claim 1 wherein the second layer has a smooth surface capable of transferring a computer mouse thereon.

6. The mousepad of claim 1 wherein the surface on which information is written includes a grid.

7. An apparatus for storing information, the apparatus comprising:
a mousepad having a thickness and further having an opaque top surface and a bottom surface;
a removable section contained in the mousepad and removable from the mousepad wherein the removable section has a thickness less than the thickness of the mousepad; and
a surface on which information is written disposed on the removable section wherein the surface on which information is written is concealed by the opaque top surface.

8. The apparatus of claim 7 wherein the removable section in contained within the mousepad wherein the removable section is substantially the same size and shape as an area from which the removable section is removed from the mousepad.

9. The apparatus of claim 7 wherein the surface on which information is written has a grid.

10. A method for using a mousepad and for storing information, the method comprising the steps of:
providing a mousepad having an opaque top layer and a bottom layer;
providing a concealed surface on which information is written between the opaque top layer and the bottom layer of the mousepad;
exposing the concealed surface on which information is written; and
writing information on the concealed surface on which information is written.

11. The method of claim 10 further comprising the step of:
providing a fastener disposed on one of the top layer or the bottom layer wherein the fastener removably attaches the top layer to the bottom layer.

12. The method of claim 11 wherein the fastener is an adhesive.

13. The method of claim 10 further comprising the steps of:
providing a removable section within the mousepad; and
disposing the surface on which information is written on the removable section.

14. The method of claim 10 further comprising the step of:
providing a grid on the concealed surface on which information is written.

* * * * *